United States Patent
Xiang et al.

(10) Patent No.: US 11,899,612 B2
(45) Date of Patent: Feb. 13, 2024

(54) ONLINE UPGRADING METHOD AND SYSTEM FOR MULTI-CORE EMBEDDED SYSTEM

(71) Applicant: Celestica Technology Consultancy (Shanghai) Co. Ltd, Shanghai (CN)

(72) Inventors: Zhi Xiang, Shanghai (CN); Yaoting Zhan, Shanghai (CN); Minghua Yang, Shanghai (CN)

(73) Assignee: Celestica Technology Consultancy (Shanghai) Co. Ltd, Shanghai (CN)

( * ) Notice: Subject to any disclaimer, the term of this patent is extended or adjusted under 35 U.S.C. 154(b) by 237 days.

(21) Appl. No.: 17/468,677

(22) Filed: Sep. 8, 2021

(65) Prior Publication Data

US 2022/0206780 A1    Jun. 30, 2022

(30) Foreign Application Priority Data

Dec. 30, 2020    (CN) .......................... 202011611590.3

(51) Int. Cl.

| | |
|---|---|
| *G06F 8/65* | (2018.01) |
| *G06F 15/78* | (2006.01) |
| *G06F 13/28* | (2006.01) |
| *G06F 13/42* | (2006.01) |
| *G06F 13/24* | (2006.01) |

(Continued)

(52) U.S. Cl.
CPC .......... *G06F 15/7807* (2013.01); *G06F 3/061* (2013.01); *G06F 8/65* (2013.01); *G06F 13/24* (2013.01); *G06F 13/28* (2013.01); *G06F 13/32* (2013.01); *G06F 13/4282* (2013.01); *G06F 1/28* (2013.01); *G06F 9/5016* (2013.01);

(Continued)

(58) Field of Classification Search
CPC . G06F 1/28; G06F 3/061; G06F 13/24; G06F 9/5016; G06F 2213/0026; G06F 15/7807; G06F 8/65; G06F 13/28; G06F 13/4282; H04L 63/105; H03K 19/177
See application file for complete search history.

(56) References Cited

U.S. PATENT DOCUMENTS

| | | | |
|---|---|---|---|
| 10,860,305 B1 * | 12/2020 | Harland | ............... H03K 19/177 |
| 2014/0109076 A1 * | 4/2014 | Boone | ................... H04L 63/105 |
| | | | 717/170 |

(Continued)

*Primary Examiner* — Tuan A Vu
(74) *Attorney, Agent, or Firm* — IPRTOP LLC

(57) ABSTRACT

The present disclosure provides an online upgrade method and system for a multi-core embedded system. The system includes a service system and a multi-core embedded system. The service system is used to provide upgrade firmware files. The multi-core embedded system includes: a system on chip, including a multi-core embedded processor system and a programmable logic module, the programmable logic module maps the memory of the multi-core embedded processor system to the service system; a communication module, establishing the communication connection between the system on chip and the service system, receiving and caches the upgraded firmware files from the service system; a DMA module, used for fast data transfer between the communication module and the memory of the multi-core embedded processor system; an interrupt controller, executing interrupt processing, so that the multi-core embedded processor system can obtain the upgraded firmware files through the memory.

9 Claims, 3 Drawing Sheets

(51) Int. Cl.
  *G06F 3/06*    (2006.01)
  *G06F 13/32*   (2006.01)
  *H03K 19/177*  (2020.01)
  *G06F 9/50*    (2006.01)
  *H04L 9/40*    (2022.01)
  *G06F 1/28*    (2006.01)

(52) U.S. Cl.
  CPC .... *G06F 2213/0026* (2013.01); *H03K 19/177* (2013.01); *H04L 63/105* (2013.01)

(56) References Cited

U.S. PATENT DOCUMENTS

2017/0017580 A1* 1/2017 Wilkerson .............. G06F 3/061
2019/0370207 A1* 12/2019 Leyrer .................. G06F 9/5016
2020/0183866 A1* 6/2020 Hindle .................... G06F 13/24
2020/0333818 A1* 10/2020 Yun ........................ G06F 1/28

\* cited by examiner

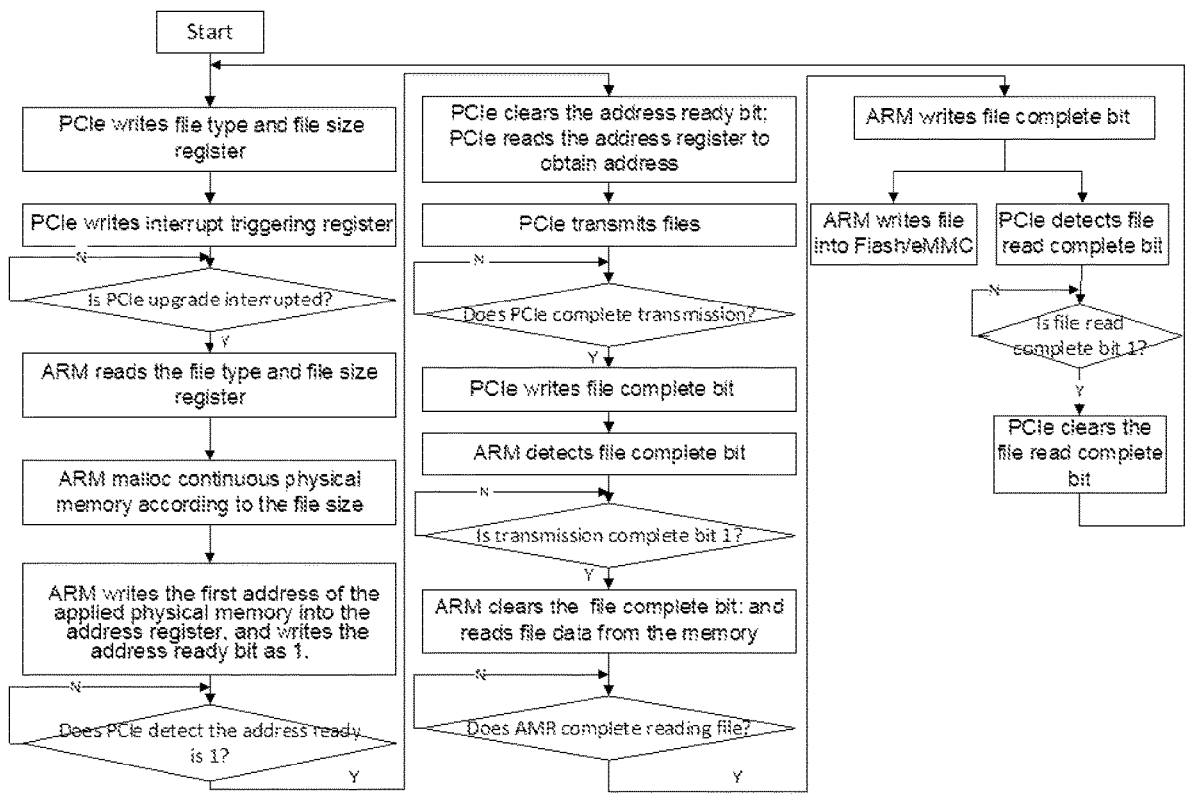

Fig. 4

| A multi-core embedded processor system is connected to a service system providing upgraded firmware files through a communication module, the programmable logic circuit maps the memory of the multi-core embedded processor system to the service system; the multi-core embedded processor system shares a register module with the programmable logic circuit | S100 |

| When the multi-core embedded system receives the upgraded firmware files sent by the service system, the multi-core embedded processor system obtains the upgraded firmware files through memory, and realizes the online upgrade of the multi-core embedded system | S200 |

Fig. 5

ONLINE UPGRADING METHOD AND SYSTEM FOR MULTI-CORE EMBEDDED SYSTEM

CROSS REFERENCES TO RELATED APPLICATIONS

This application claims the benefits of priority to Chinese Patent Application No. CN 2020116115903, filed with CNIPO on Dec. 30, 2020, the contents of which are incorporated herein by reference in its entirety.

TECHNICAL FIELD

The present disclosure relates to the technical field of embedded system, and in particular, relates to an online upgrade method and system for a multi-core embedded system.

BACKGROUND

MPSoC is the second-generation multi-processing SoC system launched by Xilinx. MPSoC includes advanced power management systems, high-density on-chip static memory, high-speed transceivers with a single channel rate up to 32 Gbps, PCI-Express interface and high performance programmable logic, etc. Traditional MPSoC platform firmware generally requires an external interface for joint test action group (JTAG), SD card or Ethernet, but MPSoC used in the data center field usually only has the PCI-Express interface, instead of having external interfaces.

When an MPSoC which is not equipped with external interfaces for JTAG, SD card, or Ethernet needs to upgrade, the electronic equipment that uses the MPSoC, such as the server, needs to be powered off and restarted, other functional modules in the server will be affected.

SUMMARY

The present disclosure provides an online upgrade method and system for a multi-core embedded system, to solve the inconvenience in upgrading of a multi-core embedded system.

The present disclosure provides an online upgrade system for a multi-core embedded system, including a service system and a multi-core embedded system; the service system provides upgrade firmware files required for the upgrade of the multi-core embedded system; the multi-core embedded system includes: a system on chip, including a multi-core embedded processor system and a programmable logic module located in the system on chip, wherein the programmable logic module maps the memory of the multi-core embedded processor system to the service system; a communication module, connected to the programmable logic module of the system on chip, establishing a communication connection between the system on chip and the service system, and receiving and caching upgrade firmware files from the service system; a register module, configured in the programmable logic module of the system on chip, the programmable logic module of the system on chip and the multi-core embedded processor system share the register module, and the register module is used for control information interaction between the multi-core embedded processor system and the service system; a DMA module, used for fast data transfer between the communication module and the memory of the multi-core embedded processor system; and an interrupt controller, configured in the programmable logic module of the system on chip, and triggering an interrupt request through the register module, and performing interrupt processing when receiving the upgrade firmware files from the service system, so that the multi-core embedded processor system obtains the upgrade firmware files through the memory, and realizes the online upgrade of the multi-core embedded system.

In an embodiment of the present application, the programmable logic module is a field programmable gate array (FPGA), the multi-core embedded processor system is a multi-core embedded ARM processor system, and the service system is an X86 service system.

In an embodiment of the present application, the programmable logic module maps the memory of the multi-core embedded processor system to the service system through the switch of an external PCI-Express bus and an internal AXI4 bus.

In an embodiment of the present application, the multi-core embedded processor system adopts the MPSoC architecture.

In an embodiment of the present application, the system on chip further includes a double-rate memory particle or memory chips connected with the multi-core embedded processor system, an embedded multimedia memory, and a flash memory based on queue serial peripheral interface protocol.

In an embodiment of the present application, the multi-core embedded processor system writes the upgraded firmware files obtained from the memory into the embedded multimedia memory or the flash memory based on queue serial peripheral interface protocol.

In an embodiment of the present application, the communication module is a PCI-Express interface.

The embodiment of the present disclosure further provides an online upgrade method of a multi-core embedded system, including: a multi-core embedded processor system is connected to a service system providing upgraded firmware files through a communication module, the method comprises: mapping, by the programmable logic module, the memory of the multi-core embedded processor system to the service system; wherein the multi-core embedded processor system shares a register module with the programmable logic module; when the multi-core embedded system receives the upgrade firmware files sent by the service system, obtaining, by the multi-core embedded processor system, the upgrade firmware files through memory, and realizing the online upgrade of the multi-core embedded system.

In an embodiment of the present application, the obtaining, by the multi-core embedded processor system, of the upgrade firmware files through memory includes: when the multi-core embedded system receives the upgrade firmware file transmission instruction sent by the service system, the multi-core embedded processor system obtains the file size and file type of the firmware file to be upgraded from the register module, and the multi-core embedded processor system applies for a memory address based on the size of the upgraded firmware files and configures the address register in the register module; the server system sends the upgrade firmware files through the communication interface according to the address information provided by the address register in the register module, and configures the file transmission status when the upgrade firmware file transmission ends; the multi-core embedded processor system obtains the upgrade firmware file through the memory based on the file transmission status and file type.

In an embodiment of the present application, after obtaining the upgrade firmware file through the memory, the method further comprises: writing the upgrade firmware files into the embedded multimedia memory or flash memory based on the queue serial peripheral interface protocol according to the type of the upgrade firmware file.

The online upgrade method and system of the multi-core embedded system according to the present disclosure have the following beneficial effects:

1. The multi-core embedded system provided by the present disclosure can upgrade the firmware of the MPSoC platform without powering down the electronic device, and will not affect other functional modules in the electronic device.

2. The multi-core embedded system in the present disclosure is easy to implement, does not require additional hardware interfaces, and has a fast online upgrade speed.

BRIEF DESCRIPTION OF THE DRAWINGS

FIG. 4 shows a flow chart of the multi-core embedded processor system obtaining the upgrade firmware file through the memory in the multi-core embedded system online upgrade method of the present disclosure.

FIG. 5 shows a flow chart of the online upgrade method of the multi-core embedded system in the present disclosure.

COMPONENT REFERENCE NUMERALS

Figure 1:
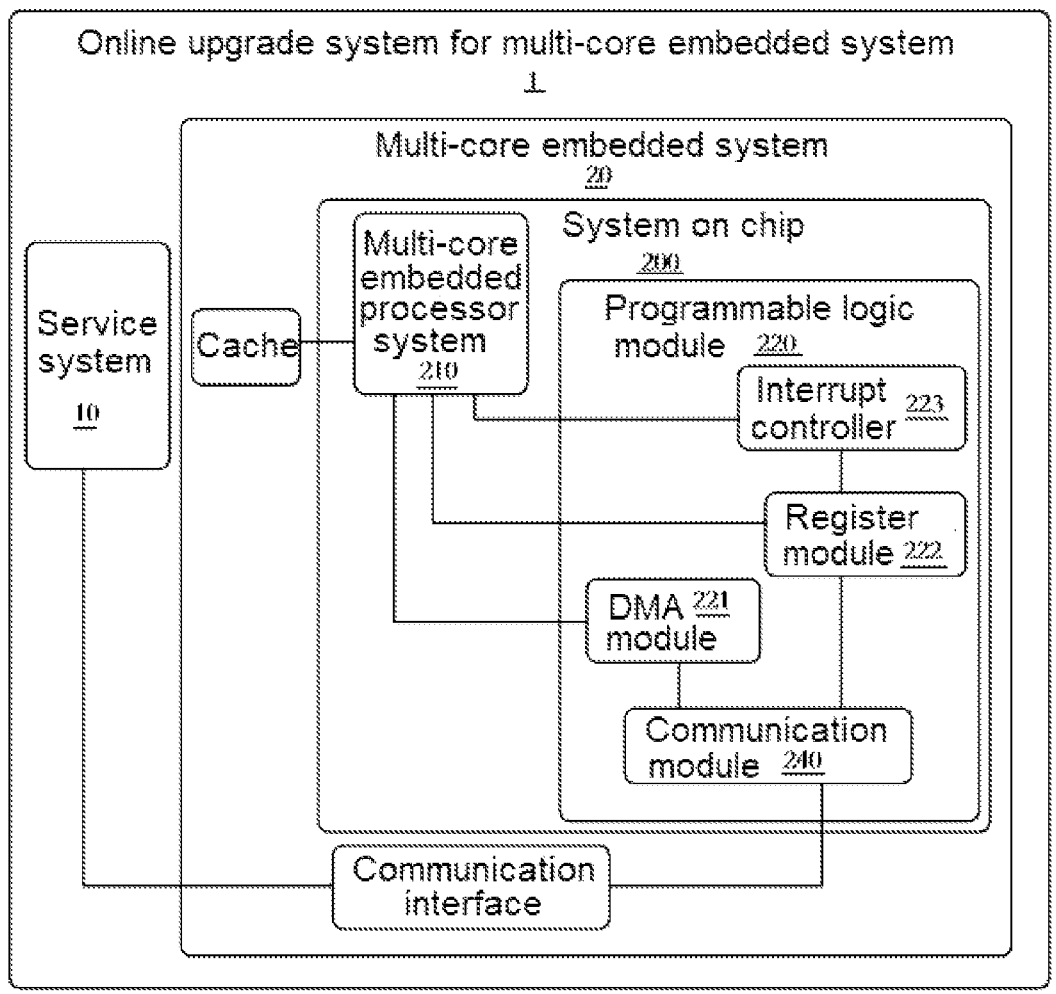
FIG. 1 shows a block diagram of the structure of the online upgrade system of the multi-core embedded system in the present disclosure.

1 Online upgrade system for multi-core embedded system
10 Service system
20 Multi-core embedded system
200 System on chip
210 Multi-core embedded processor system
211 Memory module
212 Embedded multimedia card
213 Flash memory module
220 Programmable logic module
221 DMA module
222 Register module
223 Interrupt controller
240 Communication module
S100 to S200 Operations

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different specific embodiments, and various details in this specification can also be modified or changed based on different viewpoints and applications without departing from the spirit of the present disclosure. It needs to be stated that the following embodiments and the features in the embodiments can be combined with one another under the situation of no conflict.

The purpose of this embodiment is to provide an online upgrade method and system for a multi-core embedded system, which is used to solve the technical problem of inconvenient upgrading of a multi-core embedded system in the prior art.

The principle and implementation of the online upgrade method and system for the multi-core embedded system in this embodiment will be described in detail below, so that those skilled in the art can understand the online upgrade method and system in the present disclosure without creative work.

Embodiment 1

As shown in FIG. 1, this embodiment provides an online upgrade system 1 of a multi-core embedded system. The online upgrade system 1 of a multi-core embedded system includes a service system 10 and a multi-core embedded system 20. The online upgrade system 1 of the multi-core embedded system in this embodiment adopts heterogeneous processor memory sharing. By mapping the memory and register group in the multi-core embedded system 20 to the service system 10, data interaction between the service system 10 and the multi-core embedded system 20 is achieved, and the multi-core embedded system 20 can obtain the upgraded firmware file from the service system 10.

In this embodiment, the service system 10 is used to provide upgrade firmware files required for the upgrade of the multi-core embedded system 20. Specifically, the service system 10 is, but not limited to, an X86 service system. The X86 service system is a standard X86 service system. The service system 10 is not described in detail in this embodiment.

In this embodiment, the multi-core embedded system 20 includes a system on chip 200, a communication module 240, a register module 222, and an interrupt controller 223.

The system on chip 200 includes a multi-core embedded processor system 210 and a programmable logic module 220 in the system on chip 200.

Figure 2:
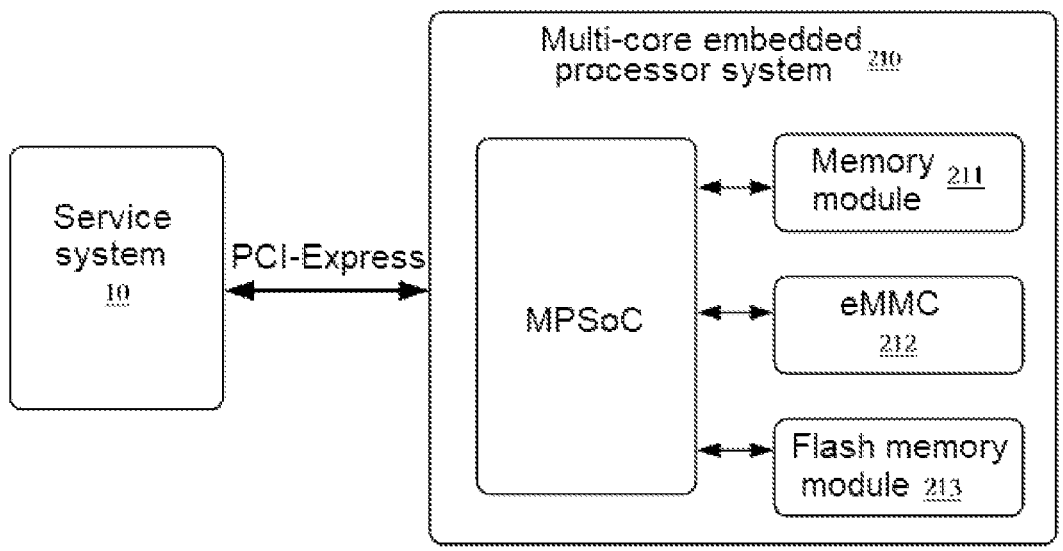
FIG. 2 is a block diagram of the frame structure of the online upgrade system of the multi-core embedded system in the present disclosure.

FIG. 2 shows a block diagram of the frame structure of the online upgrade system 1 of the multi-core embedded system in this embodiment. As shown in FIG. 2, in this embodiment, the multi-core embedded processor system 210 adopts the MPSoC architecture. The MPSoC architecture mainly includes a field programmable gate array (FPGA) and a Cortex-A53 ARM. Further, in this embodiment, the programmable logic module 220 is an FPGA, and the multi-core embedded processor system 210 is a multi-core embedded ARM processor system.

As shown in FIG. 2, in this embodiment, the multi-core embedded processor system 210 adopts an MPSoC architecture, and the MPSoC architecture further includes a memory module 211, an embedded multimedia card (eMMC) 212, a flash memory module 213, and so on. Furthermore, in this embodiment, the system on chip 200 contains a double-rate memory particle or a memory chip connected with the multi-core embedded processor system 210, an eMMC 212, and a flash memory based on the Queue Serial Peripheral Interface (QSPI) Protocol. The double-rate memory particle or the memory chip preferably adopt a fourth-generation double-rate dynamic memory particle or a dynamic memory chips (DDR4).

In this embodiment, the programmable logic module 220 is used to implement the communication module 240, the register module 222, and the interrupt controller 223. The programmable logic module 220 maps the memory of the multi-core embedded processor system 210 to the service system 10.

Specifically, in this embodiment, the programmable logic module 220 (FPGA) maps the memory of the multi-core embedded processor system 210 to the service system 10 through the switch of the external PCI-Express bus and the internal AXI4 bus.

The principle that the programmable logic module 220 (FPGA) maps the memory of the multi-core embedded processor system 210 to the service system 10 through the switch of the external PCI-Express bus and the internal AXI4 bus is as follows:

the PCI-Express bus data transmission between the service system 10 and the programmable logic module 220 (FPGA) is based on the PCI-Express bus address domain, the AXI4 bus data transmission between the programmable logic module 220 (FPGA) and the multi-core embedded ARM processor system is based on the AXI4 bus address domain. These two address domains cannot directly transmit data. It is necessary to perform the conversion of the bus address domain inside the programmable logic module 220 (FPGA), so that the conversion between the external PCI-Express bus and the internal AXI4 bus corresponds to the memory mapping between the multi-core embedded processor system 210 and the service system 10.

In the programmable logic module 220 (FPGA), the memory of the multi-core embedded ARM processor system is mapped to the service system 10 (X86 server system) through the AXI4 bus. The data bit width of the AXI4 bus is 128 bit, the bus frequency is 250 Mhz, and the data transmission bandwidth is 4 GB/s, so that the service system 10 (X86 server system) can access the memory of the multi-core embedded ARM processor system with almost zero delay.

In this embodiment, the communication module 240 is connected to the system on chip 200, and is used to establish a communication connection between the system on chip 200 and the service system 10. The communication module 240 receives and caches the upgraded firmware files from service system 10 through the communication interface.

The communication module 240 caches the upgrade firmware file through a cache. The direct memory access (DMA) module 221 is used for the fast data transfer between the communication module 240 and the memory of the multi-core embedded processor system 210.

In this embodiment, the communication module 240 is preferably a PCI-Express communication interface.

That is, the service system 10 (X86 service system) communicates with the multi-core embedded ARM processor system through the PCI-Express interface bus.

In this embodiment, the register module 222 is configured in the programmable logic module 220 of the system on chip 200. The programmable logic module 220 of the system on chip 200 and the multi-core embedded processor system 210 share the register module 222. The register module 222 is used for control information interaction between the multi-core embedded processor system 210 and the service system 10.

Specifically, in this embodiment, a set of registers is defined inside the programmable logic module 220 (FPGA) for shared access by the service system 10 (X86 server system) and the multi-core embedded ARM processor system. The programmable logic module 220 (FPGA) implements register access arbitration logic to avoid deadlock of register access in the register module 222. The shared register in the register module 222 is used for the control information interaction between the service system 10 (X86 server system) and the multi-core embedded ARM processor system.

Therefore, the online upgrade of the multi-core embedded system 20 in this embodiment maps the local memory of the multi-core embedded processor system 210 (MPSoC) and the register group to the service system 10 (X86 server system), so as to achieve data interaction between the service system 10 (X86 server system) and the multi-core embedded ARM processor system.

In this embodiment, the interrupt controller 223 is configured in the programmable logic module 220 of the system on chip 200, and is configured to perform interrupt processing when receiving the upgrade firmware files from the service system 10, so that the multi-core embedded processor system 210 obtains the upgrade firmware file from the cache through the memory, and realizes the online upgrade of the multi-core embedded system 20. Therefore, the multi-core embedded system 20 in this embodiment can upgrade the firmware of the MPSoC platform without powering down the electronic device, and will not affect other functional modules in the electronic device. The multi-core embedded system in the present disclosure is easy to implement, does not require additional hardware interfaces, and has a fast online upgrade speed.

In this embodiment, the multi-core embedded processor system 210 writes the upgraded firmware files obtained from the memory into the embedded multimedia card 212 (eMMC) or the flash memory based on queue serial peripheral interface protocol.

Figure 3:
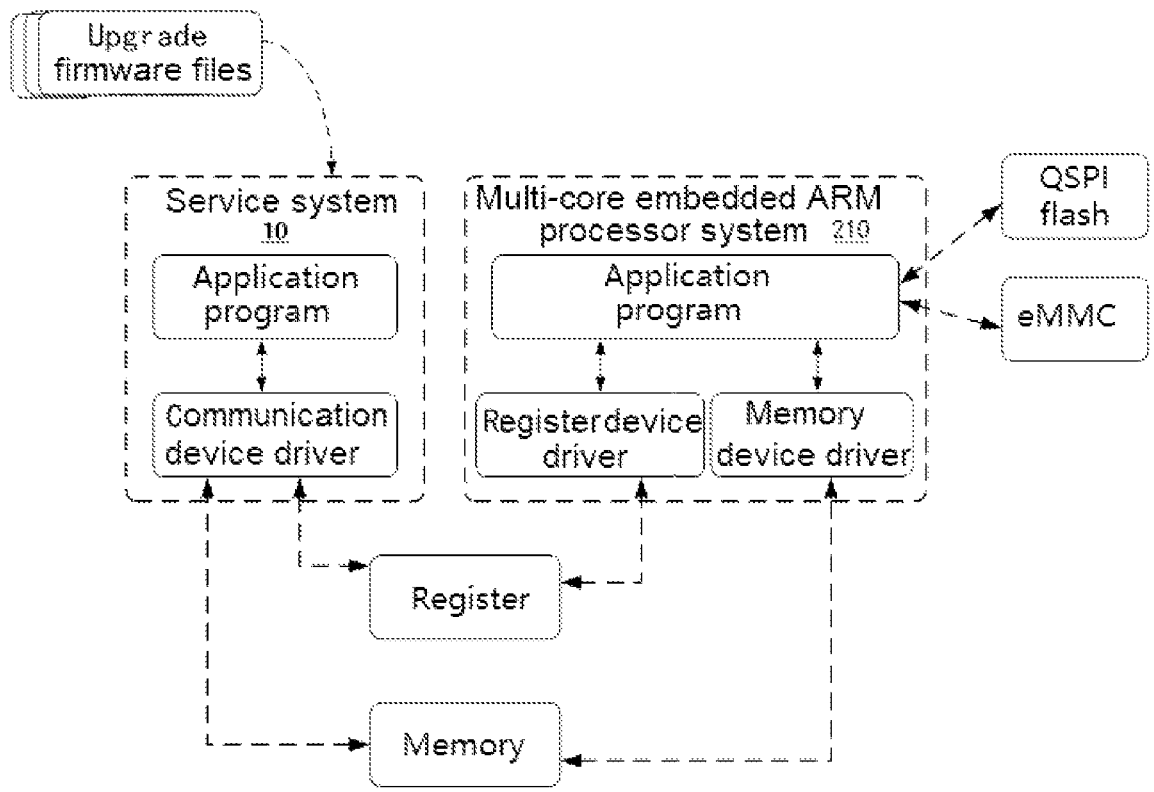
FIG. 3 shows a block diagram of the software framework of the online upgrade system of the multi-core embedded system in the present disclosure.

FIG. 3 shows a block diagram of the software framework of the online upgrade system 1 of the multi-core embedded system in this embodiment. As shown in FIG. 3, the service system 10 (X86 server system) includes an application program and a communication device driver (a PCIE device driver). The application program mainly sends the files to be upgraded to the PCIE device driver and accesses the shared register. The PCIE device driver is mainly interactive with the PCIE device driver in the multi-core embedded system 20.

The multi-core embedded ARM processor system includes an ARM application program and an ARM device driver program. The ARM device driver program includes a shared register device driver and a memory device driver, and is used for the applications to access external hardware. The ARM application program is used to access the shared register, read the upgraded firmware files issued by the service system 10 (X86 server system) from the memory, and write the upgraded firmware files into the flash memory based on the queue serial peripheral interface (QSPI) protocol and the embedded multimedia card (eMMC) for storage, to realize online upgrade of the multi-core embedded system 20.

In this embodiment, as shown in FIG. 4, the obtaining, by the multi-core embedded processor system 20 in the online upgrade system 1 of the multi-core embedded system, of the upgrade firmware files for upgrading from the service system includes:

the communication interface (PCI-Express communication interface) receives the instruction issued by the service system 10 (X86 server system) to transmit the upgraded firmware files, the communication interface writes file type and file size registers. The communication interface triggers the interrupt controller 223. After the multi-core embedded system 20 receives an interrupt request to determine that the service system 10 is about to upgrade the multi-core embedded system 20, the multi-core embedded ARM processor system reads the file type and file size register, and executes the dynamic memory allocation (malloc) of continuous physical memory according to the file size. The multi-core embedded ARM processor system writes the first address of the applied continuous physical memory into the address register, and then writes the address ready bit as 1.

When detecting that the address ready bit is 1, the communication interface reads the address register to obtain the address and clears the address ready bit, and then the communication interface starts to transmit the upgrade firmware files. After the communication interface transfers the upgrade firmware files, the communication interface writes the file transfer status bit as 1. When detecting that the file transfer status bit is 1, the multi-core embedded ARM processor system reads the file data of the upgrade firmware files from the memory, and clears the file transfer status bit. After the multi-core embedded ARM processor system completes the data reading of the upgrade firmware files, the write file read completion bit is 1. The upgrade firmware files are written into the flash memory based on the QSPI protocol or embedded multimedia card 212 (eMMC) for storage according to the obtained file type, to realize online upgrade of the multi-core embedded system 20. At the same time, when the communication interface detects that the file read complete bit is 1, the communication interface clears the file read complete bit, and the multi-core embedded system 20 completes the process of obtaining the upgraded firmware file for upgrading from the service system 10.

Embodiment 2

As shown in FIG. 5, this embodiment provides an online upgrade method for a multi-core embedded system, which is applied to an MPSoC platform. The method includes the following operations:

operation S100, a multi-core embedded processor system is connected to a service system providing upgraded firmware files through a communication module, the method comprises: mapping, by the programmable logic module, the memory of the multi-core embedded processor system to the service system; wherein the multi-core embedded processor system shares a register module with the programmable logic module;

operation S200: when the multi-core embedded system receives the upgrade firmware files sent by the service system, obtaining, by the multi-core embedded processor system, the upgrade firmware files through memory, and realizing the online upgrade of the multi-core embedded system.

Specifically, in this embodiment, the obtaining, by the multi-core embedded processor system, of the upgrade firmware files through memory includes:

1) when the multi-core embedded system receives the upgrade firmware file transmission instruction sent by the service system, the multi-core embedded processor system obtains the file size and file type of the firmware file to be upgraded from the register module, and the multi-core embedded processor system applies for a memory address based on the size of the upgraded firmware files and configures the address register in the register module.

2) the server system sends the upgrade firmware files through the communication interface according to the address information provided by the address register in the register module, and configures the file transmission status when the upgrade firmware file transmission ends.

3) the multi-core embedded processor system obtains the upgrade firmware file through the memory based on the file transmission status and file type.

4) after obtaining the upgrade firmware file through the memory, the method further comprises: writing the upgrade firmware files into the embedded multimedia memory or flash memory based on the queue serial peripheral interface protocol according to the type of the upgrade firmware file.

The implementation principle of the online upgrade method for the multi-core embedded system in this embodiment is the same as that of the online upgrade system 1 of the multi-core embedded system in Embodiment 1, the identical or similar technical features will not be repeated herein.

In summary, the multi-core embedded system in the present disclosure can upgrade the firmware of the MPSoC platform without powering down the electronic device, and will not affect other functional modules in the electronic device. The multi-core embedded system in the present disclosure is easy to implement, does not require additional hardware interfaces, and has a fast online upgrade speed. Therefore, the present disclosure effectively overcomes various shortcomings in the prior art and has high industrial value.

The above-mentioned embodiments only exemplary illustrate the principles and effects of the present disclosure, and are not used to limit the present disclosure. Those skilled in the art can make modifications or changes to the above-mentioned embodiments without going against the spirit and the range of the present disclosure. Therefore, all equivalent modifications or changes made by those with ordinary knowledge in the technical field without departing from the spirit and technical ideas disclosed in the present disclosure should still be covered by the claims of the present disclosure.

The invention claimed is:

1. An online upgrade system for a multi-core embedded system, comprising:
a service system and a multi-core embedded system;
wherein the service system provides upgrade firmware files required for the upgrade of the multi-core embedded system;
wherein the multi-core embedded system includes:
a system on chip, including a multi-core embedded processor system and a programmable logic module located in the system on chip, wherein the programmable logic module maps the memory of the multi-core embedded processor system to the service system;
a communication module, connected to the programmable logic module of the system on chip, establishing a communication connection between the system on chip and the service system, and receiving and caching upgrade firmware files from the service system;
a register module, configured in the programmable logic module of the system on chip, wherein the programmable logic module of the system on chip and the multi-core embedded processor system share the register module, and the register module is used for control information interaction between the multi-core embedded processor system and the service system;

a DMA module, used for fast data transfer between the communication module and the memory of the multi-core embedded processor system; and an interrupt controller, configured in the programmable logic module of the system on chip, and triggering an interrupt request through the register module, and performing interrupt processing when receiving the upgrade firmware files from the service system, so that the multi-core embedded processor system obtains the upgrade firmware files through the memory, and realizes the online upgrade of the multi-core embedded system, wherein the programmable logic module maps the memory of the multi-core embedded processor system to the service system through the switch of an external PCI-Express bus and an internal AXI4 bus.

2. The online upgrade system for the multi-core embedded system according to claim 1, wherein the programmable logic module is a field programmable gate array (FPGA), the multi-core embedded processor system is a multi-core embedded ARM processor system; the service system is an X86 serve system.

3. The online upgrade system for the multi-core embedded system according to claim 1, wherein the multi-core embedded processor system adopts an MPSoC architecture.

4. The online upgrade system for the multi-core embedded system according to claim 1, wherein the system on chip further includes a double-rate memory particle or a memory chip connected with the multi-core embedded processor system, an embedded multimedia memory, and a flash memory based on queue serial peripheral interface protocol.

5. The online upgrade system for the multi-core embedded system according to claim 4, wherein the multi-core embedded processor system writes the upgraded firmware files obtained from the memory into the embedded multimedia memory or the flash memory based on queue serial peripheral interface protocol.

6. The online upgrade system for the multi-core embedded system according to claim 1, wherein the communication module is a PCI-Express interface.

7. An online upgrade method for a multi-core embedded system, wherein the multi-core embedded system is connected to a service system providing upgraded firmware files through a communication module, wherein the method comprises:

mapping, by the programmable logic module, the memory of the multi-core embedded processor system to the service system, wherein the multi-core embedded processor system shares a register module with the programmable logic module; and when the multi-core embedded system receives the upgrade firmware files sent by the service system, obtaining, by the multi-core embedded processor system, the upgrade firmware files through memory, and realizing the online upgrade of the multi-core embedded system, wherein the programmable logic module maps the memory of the multi-core embedded processor system to the service system through the switch of an external PCI-Express bus and an internal AXI4 bus.

8. The online upgrade method for the multi-core embedded system according to claim 7, wherein the obtaining, by the multi-core embedded processor system, of the upgrade firmware files through memory comprises:

when the multi-core embedded system receives the upgrade firmware file transmission instruction sent by the service system, the multi-core embedded processor system obtains the file size and file type of the firmware file to be upgraded from the register module, and the multi-core embedded processor system applies for a memory address based on the size of the upgraded firmware files and configures the address register in the register module;

the server system sends the upgrade firmware files through the communication interface according to the address information provided by the address register in the register module, and configures the file transmission status when the upgrade firmware file transmission ends;

the multi-core embedded processor system obtains the upgrade firmware file through the memory based on the file transmission status and file type.

9. The online upgrade method for the multi-core embedded system according to claim 7, wherein after obtaining the upgrade firmware file through the memory, the method further comprises: writing the upgrade firmware files into the embedded multimedia memory or flash memory based on the queue serial peripheral interface protocol according to the type of the upgrade firmware file.

\* \* \* \* \*